United States Patent Office 3,576,897
Patented Apr. 27, 1971

3,576,897
PROCESS FOR THE PRODUCTION OF 1,2,4-DI-
ALKYLISOPROPYL-BENZENES AND 1,2,4,5-DI-
ALKYLDIISOPROPYLBENZENES
Max Strohmeyer, Ludwigshafen (Rhine), Germany, assignor to Badische Anilin- & Soda-Fabrik Aktiengesellschaft, Ludwigshafen (Rhine), Germany
No Drawing. Filed July 3, 1968, Ser. No. 742,183
Claims priority, application Germany, July 8, 1967,
P 16 43 627.4
Int. Cl. C07c 3/50
U.S. Cl. 260—671
7 Claims

ABSTRACT OF THE DISCLOSURE

The production of 1,2,4-dialkylisopropylbenzenes and 1,2,4,5-dialkyldiisopropylbenzenes by reaction of dialkylbenzenes with propylene in the presence of an aluminum chloride/hydrogen chloride catalyst and a polyalkylbenzene which is more basic than 1,4-dimethyl-2,5-diisopropylbenzene.

This invention relates to a new process for the production of 1,2,4 - dialkylisopropylbenzenes and 1,2,4,5-dialkyldiisopropylbenzenes by reaction of dialkylbenzenes with propylene. As is well known these compounds may be readily converted into trimellitic acid and pyromellitic acid and they are therefore of great industrial interest.

It is known that these compounds can be prepared by reaction of dialkylbenzenes with propylene in the presence of sulfuric acid as catalyst (cf. J. Am. Chem. Soc., volume 65 (1943), page 320). The reaction does not proceed satisfactorily however because considerable amounts of alkyl sulfates are formed as byproducts. An aluminum chloride/hydrogen chloride catalyst and a temperature range of from −50° to +50° C. are recommended for the reaction in U.S. Pat. No. 2,909,575. It is possible to obtain satisfactory yields at very low temperatures in this way, but the withdrawal of heat and (because the reaction products readily crystallize out) mixing during the reaction offer great difficulty. At room temperature isomerization takes place and the 1,3,5-dialkylisopropylbenzene is finally isolated as the main product. This isomer is undesirable however because (a) it is unsuitable as starting material for trimellitic acid, (b) it cannot be rearranged into the 1,2,4-isomer in a satisfactory way and (c) a direct further alkylation into 1,2,4,5-dialkyldiisopropylbenzene is not possible.

It is therefore the object of the present invention to make 1,2,4-dialkylisopropylbenzenes and 1,2,4,5-dialkyldiisopropylbenzenes accessible better industrially.

We have now found that 1,2,4-dialkylisopropylbenzenes and 1,2,4,5-dialkyldiisopropylbenzenes are obtained in good yields by reaction of dialkylbenzenes with propylene in the presence of an aluminum chloride/hydrogen chloride catalyst when a polyalkylbenzene which is more basic than 1,4-dimethyl-2,5-diisopropylbenzene is used as a further component of the catalyst.

Such polyalkylbenzenes have a stronger affinity for the Lewis acid aluminum chloride than for 1,4-dimethyl-2,5-diisopropylbenzene and prevent transalkylation of the desired reaction products, possibly by withdrawing them from the isomerizing influence of the catalyst. Surprisingly, the activity of the aluminum chloride as an alkylating catalyst is practically not affected by the polyalkylbenzene.

Examples of suitable polyalkylbenzenes are pentaalkylbenzenes and hexaalkylbenzenes whose alkyl groups may be identical or different and in general contain one to six carbon atoms. Specific examples are: pentamethylbenzene, hexamethylbenzene, hexaethylbenzene and dimethyltriisopropylbenzene. Obviously all mixtures of polyalkylbenzenes may also be used. The question whether a certain polyalkylbenzene is more basic than 1,4-dimethyl-2,5-diisopropylbenzene may easily be ascertained by experiment. The polyalkylbenzene is more basic and accordingly suitable as a catalyst component when it inhibits the isomerization of 1,4-dimethyl-2,5-diisopropylbenzene to another dimethyldiisopropylbenzene catalyzed by aluminum chloride or by aluminum chloride/hydrogen chloride. The polyalkylbenzene is advantageously used in an amount of from 0.2 to 20, preferably 0.5 to 10, particularly 1 to 5, moles per mole of aluminum chloride.

The catalyst may be prepared by mixing its components, i.e. aluminum chloride, hydrogen chloride and the polyalkylbenzene, in the presence or absence of an inert solvent such as carbon tetrachloride or carbon disulfide and removing the solvent when such has been used; the catalyst may be used in substance or on an inert carrier such as aluminum oxide, alumina or silica gel. The polyalkylbenzene or a mixture of polyalkylbenzenes may also be added to a catalyst oil obtainable in conventional manner from aluminum chloride, hydrogen chloride and dialkylbenzene. In the preferred embodiment, the three catalyst components are added to the dialkylbenzene. In this way the known oily catalyst phase is formed, if desired with the addition of a small amount of propylene. It is advantageous to "develop" the catalyst prepared from the three components by heating it for a short time at a temperature of from 50° to 120° C.

The new process does not differ from the prior art alkylation reactions as regards the concentration of the aluminum chloride/hydrogen chloride catalyst used. Generally 0.1 to 10%, preferably 0.3 to 5%, particularly 0.5 to 2%, by weight of aluminum chloride is used with reference to the dialkylbenzene used. Hydrogen chloride is used as a cocatalyst in a small amount, generally 0.01 to 1 mole per mole of aluminum trichloride. Obviously compounds which form hydrogen chloride under the reaction conditions, such as alkyl chlorides, may be used instead of hydrogen chloride.

o-Dialkylbenzenes, m-dialkylbenzenes and p-dialkylbenzenes, particularly those having lower alkyl radicals which contain one to four carbon atoms, are suitable as starting materials for the production of the desired products. The alkyl radicals attached to the benzene ring may be identical or different. Examples are o-xylene, m-xylene, p-xylene, p-methylethylbenzene, m-diethylbenzene, p-dibutylbenzene, p-methylisopropylbenzene and particularly o-diisopropylbenzene, m-diisopropylbenzene and p-diisopropylbenzene. An industrial mixture which is formed by reaction of benzene or cumene with propylene in the presence of Friedel-Crafts catalysts and which contains the isopropylbenzenes as the main product may be used instead of the pure diisopropylbenzenes. This production of the diisopropylbenzenes may be carried out using the same catalysts as are used for the subsequent further reaction with propylene. Similiarly, industrial mixtures which form in the analogous reaction of alkylbenzenes with propylene may be used instead of alkylisopropylbenzenes.

Propylation is carried out in the conventional temperature range, for example from 20° to 150° C., preferably from 40° to 100° C. Generally, atmospheric pressure is used although superatmospheric pressure, for example up to 10 atmospheres gauge, may be used.

The reaction may be carried out batchwise or continuously. It is advantageous to choose a molar ratio of dialkylbenzene: propylene of from 1:0.5 to 1:2. An excess of propylene does not bring any advantage nor any disadvantage because a propylation beyond the stage of 1,2,4,5-dialkyldiisopropylbenzene does not take place. For the production of 1,2,4-dialkylisopropylbenzenes it is advantageous to choose a molar ratio of dialkylbenzene: propylene which is more than 1:2, advantageously more than 1:1.

Dialkylbenzene and catalyst may be placed in a vessel and propylene passed in until the desired degree of alkylation has been reached, but an equilibrium mixture, for example in a stirred vessel provided with an overflow or in a stirred cascade, may have catalyst and starting materials continuously metered in with simultaneous withdrawal of reaction product.

To work up the reaction mixture either the catalyst phase is separated and if desired returned to the reaction or the catalyst is destroyed, for example by adding water. The organic phase is washed with water to remove traces of acid. The products are separated in the conventional way, for example by distillation and/or crystallization. Unreacted starting material is returned to the reaction. 1,3,5 - dialkylisopropylbenzenes, particularly 1,3,5 - triisopropylbenzene may be converted in known manner by transalkylation with benzene into a mixture containing cumene and diisopropylbenzene and this may also be returned to the reaction.

The new process has a number of advantages. The products are not contaminated by alkyl sulfates. The reaction can be carried out in a temperature range in which removal of the heat of the strongly exothermic reaction offers no difficulty. Mixing of the reaction mixture may also be achieved in a simple manner. 1,3,5-dialkylisopropylbenzene is formed only in insignificant amounts.

The invention is illustrated by the following Examples. The percentages given in the examples are by weight unless otherwise stated.

EXAMPLE 1

21 g. of catalyst complex oil I is added to 700 g. of p-xylene and then within 3.5 hours propylene is passed in (molar ratio of p-xylene:propylene=1.2) at about 75° C. with vigorous stirring.

The catalyst complex oil I is prepared as follows: 150 g. of a mixture containing about 60% of dimethyltriisopropylbenzene as well as hydrocarbons of higher molecular weight (distillation residue from a preceding alkylation batch) and 75 g. of aluminum chloride are stirred at 75° C. while at the same time passing in hydrogen chloride (about 7.5 liters per hour) for three hours.

The propylation mixture is decomposed with water and washed with caustic soda solution until neutral. It has the following composition:

|   | Percent |
|---|---|
| 1,4-dimethyl-2-isopropylbenzene | 0.2 |
| 1,2-dimethyl-4-isopropylbenzene | 0.5 |
| 1,3-dimethyl-2-isopropylbenzene | 2.0 |
| 1,4-dimethyl-2,5-diisopropylbenzene | 92.9 |
| Isomeric dimethyldiisopropylene benzenes and substances of higher boiling point | 4.6 |

EXAMPLE 2

21 g. of catalyst complex oil I (see Example 1) is added to 700 g. of p-xylene and then propylene is passed in at 25° C. with vigorous stirring and cooling. Another 10 g. of catalyst complex oil I is added after a reaction period of one hour and after a total of 3.5 hours at a molar ratio of xylene:propylene of 1:2 the introduction of gas is stopped. The product is washed as in Example 1 and has the following composition:

|   | Percent |
|---|---|
| 1,4-dimethyl-2-isopropylbenzene | 0.05 |
| 1,2-dimethyl-4-isopropylbenzene | — |
| 1,3-dimethyl-2-isopropylbenzene | 1.35 |
| 1,4-dimethyl-2,5-diisopropylbenzene | 98.5 |
| Isomeric dimethyldiisopropylbenzenes and higher boiling point substances | 0.1 |

825 g. of 1,4-dimethyl-2,5-diisopropylbenzene having a purity of 99.8% and 451 g. of mother liquor which still contains 96% 1,4-dimethyl-2,5-diisopropylbenzene are obtained by cooling to 0° C.

EXAMPLE 3

The procedure of Example 1 is followed but the reaction is stopped after a shorter period, i.e., at a lower n-value (n=molar ratio of propylene:p-xylene). The following concentrations of 1,4-dimethyl-2-isopropylbenzene are obtained in the product depending on the n-value and temperature:

| n-value: | Temperature, ° C. | Percent content of 1,4-dimethyl-2-isopropylbenzene |
|---|---|---|
| 0.56 | 20 | 22.8 |
| 0.73 | 20 | 31.0 |
| 0.77 | 75 | 47.7 |
| 0.95 | 75 | 47.0 |
| 0.75 | 100 | 52.4 |

The washed and neutralized product is fractionally distilled. The 1,4-dimethyl-2-isopropylbenzene contained in the product is obtained quantitatively with a gas chromatographic purity of more than 99%.

EXAMPLE 4

21 g. of catalyst complex oil II is added to 700 g. of p-xylene and while stirring vigorously propylene is passed in at 25° C. The catalyst complex oil II is prepared from 232 g. of 2,4-dimethyl-1,3,5-triisopropylbenzene and 133.5 g. of aluminum chloride by heating for four hours at 75° C. while at the same time passing in 10 liters per hour of hydrogen chloride. At a rate of supply of propylene of 85 liters per hour, the propylation period is three hours. The reaction is stopped at a n-value of 1.99. The product is processed as in Example 1. The product obtained has the following composition:

|   | Percent |
|---|---|
| 1,4-dimethyl-2-isopropylbenzene | 1.0 |
| 1,2-dimethyl-4-isopropylbenzene | Trace |
| 1,3-dimethyl-2-isopropylbenzene | 0.3 |
| 1,4-dimethyl-2,5-diisopropylbenzene | 95.8 |
| Isomeric dimethyldiisopropylbenzenes and substances of higher boiling point | 2.9 |

EXAMPLE 5

21 g. of catalyst complex oil III is added to 700 g. of p-xylene and then propylene is passed in with vigorous stirring at 25° C. The catalyst complex oil III is obtained as follows: 30 g. of hexamethylbenzene and 24.7 g. of aluminum chloride is suspended in 200 g. of ligroin, 5 liters per hour of hydrogen chloride is passed in for two hours at 75° C. an dthen the catalyst complex oil III is separated.

At a propylene supply rate of 85 liters per hour, the propylation period is three hours. The reaction is stopped at a n-value of 1.99. The product is worked up as in Example 1. The product obtained has the following composition:

|   | Percent |
|---|---|
| 1,4-dimethyl-2-isopropylbenzene | 0.5 |
| 1,2-dimethyl-4-isopropylbenzene | Trace |
| 1,3-dimethyl-2-isopropylbenzene | Trace |
| 1,4-dimethyl-2,5-diisopropylbenzene | 96.1 |
| Isomeric dimethyldiiseopropylbenzenes and higher boiling point substances | 3.4 |

EXAMPLE 6

21 g. of catalyst complex oil IV is added to 700 g. of p-xylene and while stirring vigorously propylene is passed in at 25° C. The catalyst complex oil IV is obtained as follows: 50 g. of hexaethylbenzene and 27.1 g. of aluminum chloride are suspended in 300 g. of ligroin, 5 liters per hour of hydrogen chloride is passed in at 75° C. for two hours and then the catalyst complex oil is separated.

The propylation period is three hours at a rate of propylene supply of 85 liters per hour. The product is worked up as in Example 1. The product obtained has the following composition:

| | Percent |
|---|---|
| 1,4-dimethyl-2-isopropylbenzene | 0.8 |
| 1,2-dimethyl-4-isopropylbenzene | Trace |
| 1,3-dimethyl-2-isopropylbenzene | 0.2 |
| 1,4-dimethyl-2,5-diisopropylbenzene | 96.2 |
| Isomeric dimethyldiisopropylbenzenes and higher boiling point substances | 2.8 |

COMPARATIVE EXAMPLE 53.2 g. of aluminum chloride is added to 212 g. of p-xylene (2 moles) and while stirring vigorously at atmospheric pressure, propylene is passed in (650 ml. per minute). The reaction temperature is kept at 75° C. by cooling. A total of 3.90 moles of propylene is passed in within sixty-five minutes. The product thus obtained has the following composition:

| | Percent |
|---|---|
| 1,4-dimethyl-2-isopropylbenzene | 4.8 |
| 1,2-dimethyl-4-isopropylbenzene | 6.8 |
| 1,3-dimethyl-2-isopropylbenzene | 6.0 |
| 1,4-dimethyl-2,5-diisopropylbenzene | 37.8 |
| Isomeric dimethyldiisopropylbenzenes and higher boiling point substances | 44.8 |

What is claimed is:

1. A process for the production of 1,2,4-dialkylisopropylbenzenes and 1,2,4,5-dialkyldiisopropylbenzenes which comprises reacting at least one dialkylbenzene with propylene in the presence of an aluminum chloride/hydrogen chloride catalyst, using about 0.1 to 5% by weight of aluminum chloride with reference to the dialkylbenzene, and in the presence of a cocatalyst consisting essentially of a polyalkylbenzene which is more basic than 1,4-dimethyl-2,5-diisopropylbenzene in an amount of about 0.2 to 20 moles per mole of aluminum chloride.

2. A process as claimed in claim 1 wherein the amount of aluminum chloride is about 0.1 to 2% by weight with reference to the dialkylbenzene and the amount of polyalkylbenzene is about 0.2 to 5 moles per mole of aluminum chloride.

3. A process as claimed in claim 1 wherein said polyalkylbenzene is a pentaalkylbenzene or hexaalkylbenzene whose alkyl groups contain up to six carbon atoms.

4. A process as claimed in claim 1 wherein said polyalkylbenzene is a compound selected from the class consisting of dimethyltriisopropylbenzene, hexamethylbenzene, pentamethylbenzene, pentaethylbenzene and mixtures thereof.

5. A process as claimed in claim 1 wherein the reaction is carried out at a temperature of about 20° C. to 150° C.

6. A process as claimed in claim 1 wherein the reaction is carried out at a temperature of about 40° C. to 100° C.

7. A process as claimed in claim 1 wherein the reaction is carried out with a molar ratio of dialkylbenzene: propylene of about 1:0.5 to 1:2.

References Cited

UNITED STATES PATENTS 3,488,741   1/1970   Muller _____ 260—671

CURTIS R. DAVIS, Primary Examiner